No. 751,061. PATENTED FEB. 2, 1904.
C. D. DESHLER.
FILTER CLEANER.
APPLICATION FILED SEPT. 20, 1902.
NO MODEL.
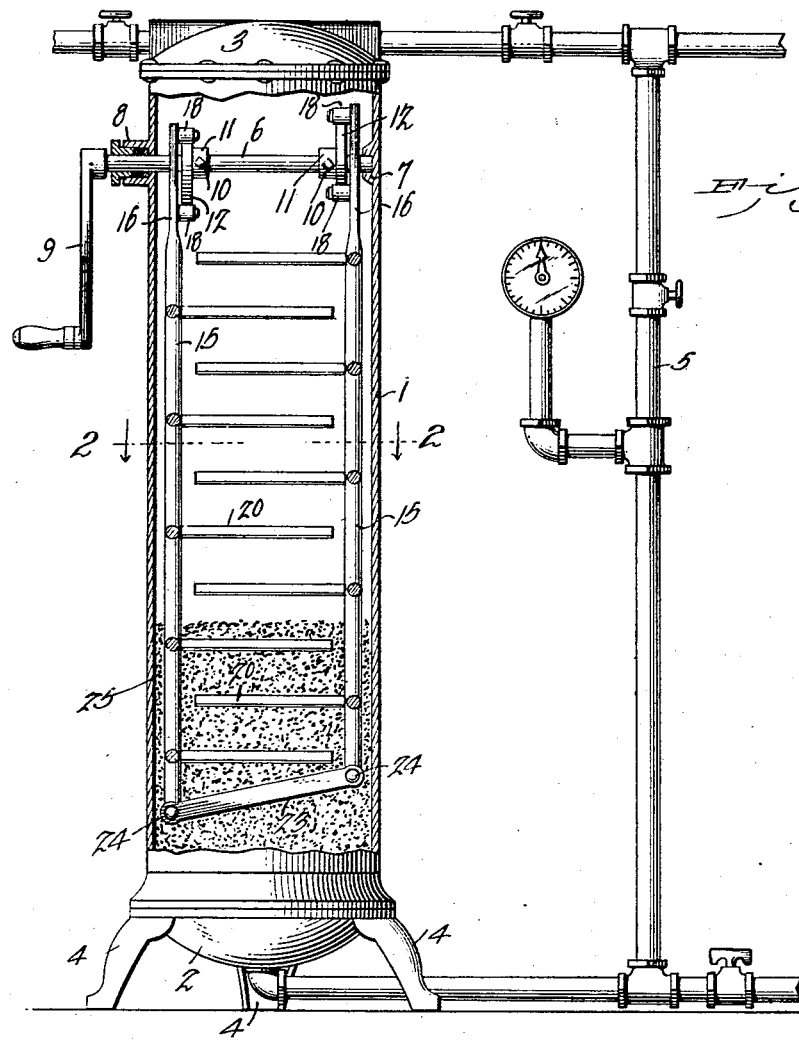
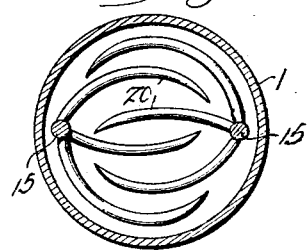
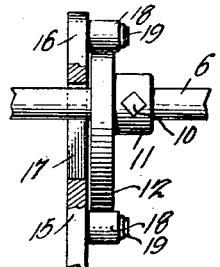
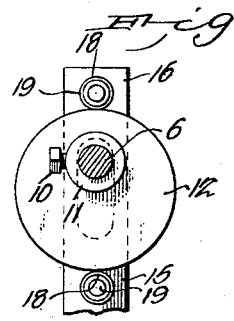
Witnesses
Charles D. Deshler, Inventor No. 751,061.

Patented February 2, 1904.

UNITED STATES PATENT OFFICE.

CHARLES D. DESHLER, OF ALLENTOWN, PENNSYLVANIA.

FILTER-CLEANER.

SPECIFICATION forming part of Letters Patent No. 751,061, dated February 2, 1904.

Application filed September 20, 1902. Serial No. 124,215. (No model.)

*To all whom it may concern:*

Be it known that I, CHARLES D. DESHLER, a citizen of the United States, residing at Allentown, in the county of Lehigh and State of Pennsylvania, have invented a new and useful Filter-Cleaner, of which the following is a specification.

This invention relates to that class of filtering devices which are provided with a granular bed, and it has for its object to provide improved means for agitating the granular bed of the filter while water is being passed in a reverse direction through the same for the purpose of cleaning the filter and carrying off impurities that may have collected in the same.

My present invention consists in the improved construction, arrangement, and operation of the agitating members, which will be hereinafter fully described and particularly pointed out in the claim.

Referring to the drawings hereto annexed, Figure 1 is a vertical sectional elevation of a filter equipped with a cleaning device constructed in accordance with the principles of my invention. Fig. 2 is a horizontal sectional view taken on the line 2 2 in Fig. 1. Figs. 3 and 4 are detail views showing, on a larger scale, the upper end of one of the agitating members and the means for operating the same.

Corresponding parts in the several figures are indicated by similar characters of reference.

The casing 1 of the filter is provided with the lower and upper heads 2 and 3 and supports 4, all of ordinary construction, as are the pipe connections 5 for supplying the unfiltered water, for discharging the filtered water, and for removing the impure water when the filter is cleaned.

6 designates a shaft journaled transversely in the upper part of the casing 1, said shaft having its bearings in a socket 7 upon the inner side of the filter-casing and in a stuffing-box 8 upon the diametrically opposite side of said casing. The shaft 6 has a crank 9 or other means whereby it may be rotated either by hand or by power.

Suitably secured upon the shaft 6, as by set-screws 10, extending through their hubs 11, are a pair of eccentric disks 12, which are so disposed as to extend in opposite directions from the axis of the shaft.

The agitating members (designated 15) are composed of rods extending vertically through the casing and provided at their upper ends with heads 16, having slots 17, whereby they are suspended from the shaft 6, which extends through the said slots. The heads 16 are provided at their upper and lower ends beyond the extremities of the slots 17 with friction-rollers 18, mounted upon pins 19, extending from said heads.

It will be observed that when the shaft 6 is rotated a vertical reciprocating motion will be imparted to the agitating members 15 by means of the oppositely-disposed eccentrics 12 engaging the rollers 18, which are spaced a distance equal to the diameter of the said eccentrics. Owing to the reverse position of said eccentrics, the said members 15 will also move in opposite directions, as will readily be understood.

The rods 15 of the agitating members are provided at suitable intervals with horizontally-extending curved arms 20. These arms may be described as being disposed in clusters upon the rods 15, each cluster being composed of a plurality of arms curved in several different directions, each cluster of arms being so disposed upon one of the agitating members that they may readily pass between the arms of the corresponding cluster upon the opposite agitating member, this being obviously necessary in order to enable the clusters of arms to pass each other when the agitating members of which they form part are being reciprocated in opposite directions by the means herein described. As regards the exact form and curvature of these arm members I do not limit myself, but reserve the right to construct said arms in any suitable manner within the scope of my invention, which simply contemplates providing each agitating member with a plurality of clusters of arms the individual members of which shall be so disposed with relation to each other as to practically cover the horizontal area of the filter-casing.

The lower ends of the agitating members 15 are connected by a knife-edge bar 23, with which their lower ends have pivotal connection, as shown at 24. The filter-casing contains the usual packing 24, of granular substance suitable for filtering purposes.

It will be well understood that when the shaft 6 is rotated the agitating members will be reciprocated alternately in opposite directions, thus thoroughly agitating the contents of the filter. This is done whenever it shall be found necessary to clean the filter, when at the same time water is fed through the filter in a reverse direction, thus loosening and carrying off the impurities that may have settled therein.

I would have it understood that while I have in the foregoing described a preferred form of my invention I do not limit myself in regard to the structural details of the same, but reserve the right to any changes and modifications which may be resorted to without sacrificing the utility or departing from the spirit and scope of my invention.

Having thus described my invention, what I claim is—

In a device of the class described, the combination of a cylindrical casing, a shaft journaled transversely near the upper end of said casing, depending rods provided at their upper ends with slots engaging said shaft, rollers mounted at the upper and lower ends of said slots, eccentric disks mounted upon the shaft and engaging between said rollers, a link pivotally connecting the lower ends of the depending rods, the pivotal connections of said link being at right angles to the axis of the shaft, and clusters of arms mounted upon the rods at intervals throughout their lengths, each cluster converging to a common point of connection with the depending rods and said arms being curved in conformity with the casing, the arms of one cluster being extended between the arms of the opposite cluster.

In testimony that I claim the foregoing as my own I have hereto affixed my signature in the presence of two witnesses.

CHARLES D. DESHLER.

Witnesses:
CHARLES J. GEHMAN,
ALTON H. BOWMAN.